(12) United States Patent
Chen et al.

(10) Patent No.: US 7,040,031 B2
(45) Date of Patent: May 9, 2006

(54) LEVEL DEVICE

(75) Inventors: Chien-Jen Chen, Taichung Hsien (TW); Zhi-hong Fang, Zhe-Jiang (CN)

(73) Assignee: Asia Optical Co., Inc., Taichung (TW)

( * ) Notice: Subject to any disclaimer, the term of this patent is extended or adjusted under 35 U.S.C. 154(b) by 0 days.

(21) Appl. No.: 10/870,980

(22) Filed: Jun. 21, 2004

(65) Prior Publication Data

US 2005/0155239 A1    Jul. 21, 2005

(30) Foreign Application Priority Data

Jan. 20, 2004  (TW) .............................. 93101532 A

(51) Int. Cl.
*G01C 5/00* (2006.01)

(52) U.S. Cl. ........................ 33/290; 33/DIG. 21; 33/286

(58) Field of Classification Search .......... 33/290–293, 33/DIG. 21, 286, 288
See application file for complete search history.

(56) References Cited

U.S. PATENT DOCUMENTS

| | | | |
|---|---|---|---|
| 3,838,927 A * | 10/1974 | Iwafune et al. ................ 33/290 |
| 5,313,409 A * | 5/1994 | Wiklund et al. ............... 33/291 |
| 5,461,473 A * | 10/1995 | Pratt et al. ..................... 33/293 |
| 5,513,201 A * | 4/1996 | Yamaguchi et al. ........... 372/75 |
| 5,553,052 A * | 9/1996 | Oono et al. ............. 369/112.17 |
| 5,978,076 A * | 11/1999 | Kitajima ....................... 33/290 |
| 6,224,217 B1 * | 5/2001 | Tanaka ......................... 353/94 |
| 6,280,082 B1 * | 8/2001 | Aoyama et al. ........ 33/DIG. 21 |
| 6,422,706 B1 * | 7/2002 | Rangan ......................... 33/264 |
| 6,688,758 B1 * | 2/2004 | Thibault ...................... 362/368 |
| 6,796,042 B1 * | 9/2004 | Kaneko ........................ 33/290 |
| 6,842,291 B1 * | 1/2005 | Bergen ......................... 33/291 |
| 6,906,864 B1 * | 6/2005 | Bergen ......................... 33/227 |
| 2003/0231511 A1 * | 12/2003 | Thibault ...................... 362/551 |
| 2005/0219706 A1 * | 10/2005 | Yamagishi ................... 359/663 |
| 2005/0232118 A1 * | 10/2005 | Sun ........................ 369/112.01 |

* cited by examiner

*Primary Examiner*—Yaritza Guadalupe
(74) *Attorney, Agent, or Firm*—Troxell Law Office, PLLC

(57) ABSTRACT

A level (100) includes a light source (10) and a cone-shaped reflecting element (40) with reflecting surface for reflecting light beam from the light source to produce a circumferential leveling plane. The light source is arranged adjacent to the peak of the cone-shaped reflecting element, and on the center axis of the cone-shaped reflecting element.

8 Claims, 3 Drawing Sheets

LEVEL DEVICE

BACKGROUND OF THE INVENTION

1. Field of the Invention

The present invention relates to a level device, and more particularly to a level device which can define a circumferential leveling plane.

2. Description of the Related Art

Nowadays, during the course of carrying out a construction project, especially when decorating the outside or inside walls of the construction, it's very difficult to mark a horizontal plane on different walls. One method is to adopt rulers to draw a horizontal line on the walls roughly, but, this kind of method is slow and not accurate, and can't ensure the quality thereof. Another method is to make use of press relation of a long thin pipe with liquid contained therein to mark a common horizontal plane on the different walls. But, this method is not convenient for application in large work site. Hence, levels which can mark a horizontal line are introduced.

According to the output modes of the light, the current leveling device is divided into two types, directly-output type and rotatably-output type. The level of directly-output mode disperses light beams from a laser device to reach a larger angle and form a parallel output along a horizontal direction by means of a cylindrical lens. This kind of level has a disadvantage that the angel of the output is limited. That is to say, the length of the leveling line on the target body marked by the level is limited. When a long or circumference mark is needed in a special circumstance, it is necessary to mark many times or to assemble several optical lens systems together so as to realize its function. The two methods provided above are inconvenient, or complicate the assembled device.

The level of the rotatably-output type rotates the point light laser source with high speed to produce a horizontal light fan-shaped plane, due to the characteristics of vision temporary stay, and to define a horizontal reference mark on the target surface. This kind level overcomes the disadvantage of marking limitation in length and angle, however, the precision of the leveling device is affect because of vibrating of the rotatable mechanism. Furthermore, this kind levels needs power to support the rotation of the mechanism.

Hence, an improved level which can define a circumference mark and is simple in configuration and low in cost is desired to overcome the above shortcomings.

BRIEF SUMMARY OF THE INVENTION

A main object of the present invention is to provide a compact and low cost level which can define a circumferential leveling plane.

To attain the above object, a level includes a light source and a cone-shaped reflecting element, the cone-shaped reflecting element defines a reflecting surface for reflecting light beams from the light source to produce a circumferential plane. The light source is positioned adjacent to a peak of the reflecting element and on the center line of the reflecting element.

Other objects, advantages and novel features of the invention will become more apparent from the following detailed description when taken in conjunction with the accompanying drawings which, by way of illustration, show preferred embodiment of the present invention and principles thereof. Other embodiments of the invention embodying the same or equivalent principles may be used and structural changes may be made as desired by those skilled in the art without departing from the present invention and the purview of the appended claims.

BRIEF DESCRIPTION OF THE DRAWINGS

The features of this invention which are believed to be novel are set forth with particularity in the appended claims. The invention, together with its objects and the advantages thereof, may be best understood by reference to the following description taken in conjunction with the accompanying drawings, in which like reference numerals identify like elements in the figures and in which:

DETAILED DESCRIPTION OF THE INVENTION

Figure 1:
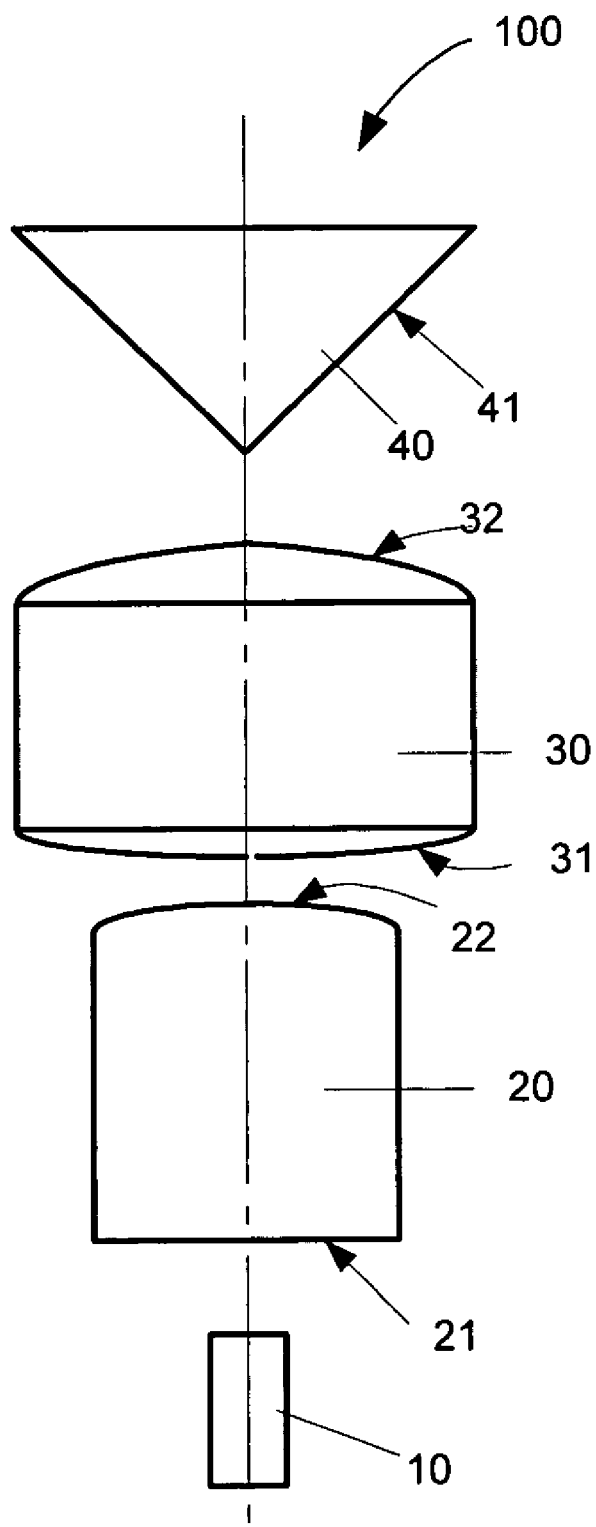
FIG. 1 is a schematic view of a level according to the present invention.

Referring to FIG. 1, a level according to the present invention includes a light source 10, a first cylindrical aspherical lens 20, a second aspherical lens 30 and a cone-shaped reflecting element 40.

Figure 2:
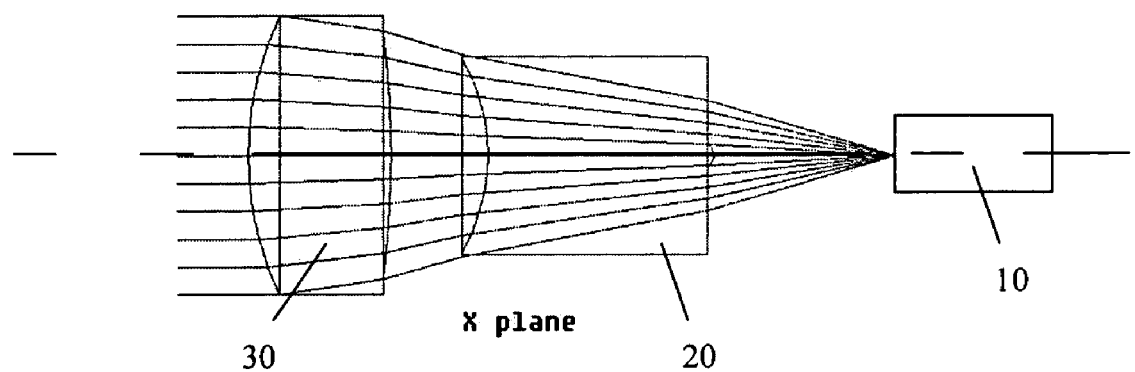
FIG. 2 is an essential optical paths diagram of the level of FIG. 1 in an x-plane.
Figure 3:
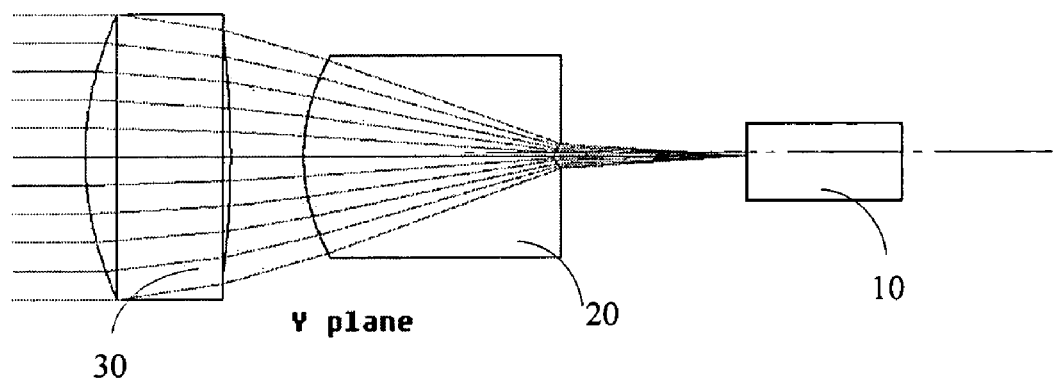
FIG. 3 is an essential optical paths diagram of the level on FIG. 1 in a y-plane.

The light source 10 is a laser device for emitting light beams in the visible range, in this particular embodiment the light source 10 is a diode laser device. The diode laser device produces a beam which is not collimated and which projects a generally elliptical diverging beam of light, with a larger dispersing angel in x-plane and a smaller dispersing angle in y-plane, as shown in FIGS. 2–3. The x-plane and the y-plane are perpendicular to each other.

The first cylindrical aspherical lens 20 is made of glass or other proper transparent materials and includes a first input surface 21 and a first output surface 22. The first input surface 21 is a plane and the first output surface 22 is an aspherical surface with a convex shape. The first cylindrical aspherical lens 20 disperses or converges the light beams emitted from the light source 10 respectively in x or y planes thereby producing a light beam with a substantially circular section thereof.

The second aspherical lens 30 has a second input surface 31 and a second output surface 32. The second input and output surfaces 31, 32 are aspherical surfaces with convex shapes. A diameter of the second aspherical lens 30 is larger than that of the first cylindrical aspherical lens 20. The aspherical lens 30 is used to collimate the light beams from the cylindrical aspherical lens 20.

The cone-shaped reflecting element 40 generally defines a peak angle of 90 degrees, and comprises a reflective circumferential surface which is inclined at an angle of 45 degrees relative to the center axis of the cone-shaped reflecting element 40. The largest diameter of the cone-shaped reflecting element 40 is larger than or equal to that of the projective area which is formed by the light being projected to the second column lens 30. Thus, the cone-shaped reflecting element 40 can receive the light beams from the second column lens 30 wholly.

Figure 4:
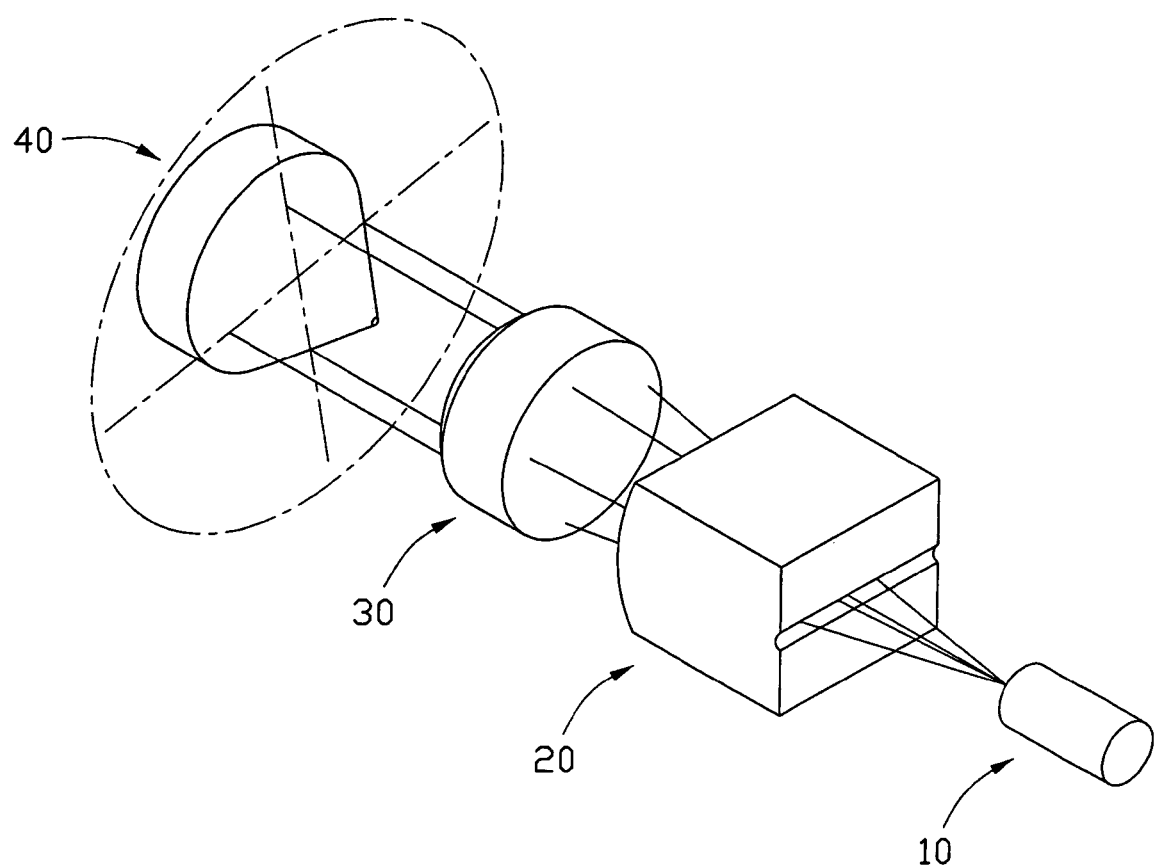
FIG. 4 is a perspective view of the level.

Also referring to FIG. 4, in assembly, the light source 10, the first cylindrical aspherical lens 20, the second aspherical lens 30 and the cone-shaped reflecting element 40 are housed in or fixed to form a single structure and mechanically aligned along a center axis in turn. That is to say, the light source 10 is arranged adjacent to the first input surface 21 of the first cylindrical aspherical lens 20, the first output surface 22 is arranged adjacent to the second input surface 31 of the second aspherical lens 30, and the peak of the cone-shaped reflective element 40 is arranged toward to the second output surface 32 of the second aspherical lens 30.

Referring to FIGS. 2–3, light beams emitted from the light source 10 in x-plane with a smaller dispersing angle are diffuse to a pre-determined angle. At the same time, light beams in y-plane with a larger dispersing angle are converged to the same angle, thus, light beams from the light source 10 are collimated to have a substantially circular cross section after passing through the first output surface 21 of the first cylindrical aspherical lens 20. Then, light beams with the pre-determined dispersing angle are transmitted to the second input surface 31 of the second aspherical lens 30, and collimated to be parallel light beams after passing through the second aspherical lens 30. Finally, the parallel light beams are transmitted to the reflective surface 41 of the reflective element 40 with incidence angles of 45 degrees. According to corresponding optical reflection law, the light beams are reflected by the reflective element 40 with reflection angle of 45 degrees and then propagate in a horizontal plane. The reflective element 40 defines a cone angle of 90 degrees, and the level 100 is placed upright on the ground, consequently, the reflected light beams are radiated in a circumferential leveling plane parallel to the ground with a certain thickness, thus to establish a reference line on the surface of the target body. The leveling precision of the leveling device 100 can control by adjusting the size of the reflective surface 41 and the thickness of the horizontal light beam plane.

Obviously, the embodiment described above provides the user with convenience to select the staple laser device, diode laser device, to perform desired functions. However, the leveling device 100 can adopt other kind light source instead of the diode laser device. If the cross section of light beams from the light source is circular, the first cylindrical aspherical lens 20 is unnecessary. Further, if the light beams from the light source are directly transmitted to the reflecting element 40 without proper dispersion, the first and second aspherical lens 20, 30 are unnecessary.

The leveling device 100 reflect light beams to form a circumferential leveling plane by means of the reflecting element. Thus the level has only a few components to achieve the object thereof, and needn't a rotatable mechanism and a larger power.

It is to be understood, however, that even though numerous, characteristics and advantages of the present invention have been set fourth in the foregoing description, together with details of the structure and function of the invention, the disclosed is illustrative only, and changes may be made in detail, especially in matters of shape, size, and arrangement of parts within the principles of the invention to the full extent indicated by the broad general meaning of the terms in which the appended claims are expressed.

What is claimed is:

1. A level device which produces a circumferential leveling plane comprising:
   a light source for emitting a visible light beam; and
   a first cylindrical lens with an aspherical lens for collimating light beams emitted from the light source to be parallel light beams, and
   a cone-shaped reflecting element with reflecting surface for receiving light beam from the light source to produce a circumferential leveling plane,
   wherein the cylindrical lens is arranged adjacent to the peak of the cone-shaped reflecting element, and on the center axis of the cone-shaped reflecting element between the light source and the cone-shaped reflecting element.

2. The level device according to claim 1, wherein the cone-shaped reflecting element has reflecting film formed thereon.

3. The level device according to claim 1, wherein the cone-shaped reflecting element has a peak angle of 90 degrees.

4. The level device according to claim 1, wherein the light source is a laser device.

5. The level device according to claim 1, wherein parallel light beams has a circular cross section.

6. The level device according to claim 5, wherein the second aspherical lens is arranged between the light source and the first cylindrical lens.

7. The level device according to claim 1, wherein the light source is a diode laser device.

8. The level device according to claim 1, wherein it further comprises a second aspherical lens which collimates the light beams from the diode laser device to be light beams with a circular cross section.

* * * * *